United States Patent
Mathison

(10) Patent No.: US 12,015,588 B2
(45) Date of Patent: Jun. 18, 2024

(54) MULTI-LEVEL AND DYNAMIC TIMERS FOR CARRIER GRADE NAT

(71) Applicant: Verizon Patent and Licensing Inc., Basking Ridge, NJ (US)

(72) Inventor: James Mathison, Greer, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 117 days.

(21) Appl. No.: 17/717,475

(22) Filed: Apr. 11, 2022

(65) Prior Publication Data

US 2023/0328029 A1 Oct. 12, 2023

(51) Int. Cl.
| | | |
|---|---|---|
| G06F 15/16 | (2006.01) | |
| G06F 9/54 | (2006.01) | |
| H04L 29/06 | (2006.01) | |
| H04L 61/2517 | (2022.01) | |
| H04L 61/256 | (2022.01) | |
| H04L 61/2592 | (2022.01) | |
| H04L 61/5053 | (2022.01) | |

(52) U.S. Cl.
CPC ........ *H04L 61/256* (2013.01); *H04L 61/2517* (2013.01); *H04L 61/2592* (2013.01); *H04L 61/5053* (2022.05)

(58) Field of Classification Search
CPC .............. H04L 61/256; H04L 61/2517; H04L 61/2592
USPC ........................................................ 709/245
See application file for complete search history.

(56) References Cited

U.S. PATENT DOCUMENTS

| | | | | |
|---|---|---|---|---|
| 8,892,724 | B1* | 11/2014 | Bertz | H04L 61/2517 709/224 |
| 10,469,446 | B1* | 11/2019 | Chigurupati | H04L 63/0892 |
| 11,178,230 | B1* | 11/2021 | Sreenivasan | H04L 67/145 |
| 2003/0212772 | A1* | 11/2003 | Harris | H04L 61/00 709/245 |
| 2003/0212795 | A1* | 11/2003 | Harris | H04L 41/0853 709/227 |
| 2004/0193683 | A1* | 9/2004 | Blumofe | H04L 12/1818 709/204 |
| 2005/0060414 | A1* | 3/2005 | Phillips | H04L 67/1017 709/227 |
| 2012/0207173 | A1* | 8/2012 | Namihira | H04L 61/2557 370/400 |
| 2013/0185404 | A1* | 7/2013 | Patel | H04L 61/2514 709/222 |
| 2013/0243007 | A1* | 9/2013 | Ding | H04L 43/16 370/412 |
| 2015/0372973 | A1* | 12/2015 | Lopez Da Silva | H04L 12/4641 370/254 |
| 2022/0174038 | A1* | 6/2022 | Yu | H04L 45/74 |
| 2022/0224669 | A1* | 7/2022 | Bouvet | H04L 63/0421 |
| 2023/0269815 | A1* | 8/2023 | Tang | H04L 65/65 370/328 |

* cited by examiner

*Primary Examiner* — Hamza N Algibhah

(57) ABSTRACT

Systems and methods described herein use a variable 2MSL timer (also referred to herein as a "port reuse timer") for a core network/gateway. A network device in a core network detects closing of a session that uses a port designated for Network Address Translation (NAT), monitors an overall NAT port utilization level, and manages release timing for the port based on the overall port utilization level.

20 Claims, 9 Drawing Sheets

MULTI-LEVEL AND DYNAMIC TIMERS FOR CARRIER GRADE NAT

BACKGROUND INFORMATION

The increasing number of devices that are connected to the Internet has exceeded the number that can be supported with unique address values using Internet Protocol version 4 (IPv4). IPv6 is a successor protocol for IPv4 and partly address the problem of IPv4 address exhaustion by providing many more available IP addresses. However, IPv6 is not backward compatible with IPv4, and many users continue to rely on IPv4 for Internet connectivity.

To address the problem of limited IPv4 addresses, Network Address Translation (NAT) allows multiple end customers to use any private address range for their internal networks. A NAT service may translate these private IP addresses (which may not be globally unique) to public IP addresses when routing internal hosts to external hosts. Thus, standard NAT maps multiple private domain internal addresses to a single global public address. However, a continuing increase in standard NAT deployments has created a need for addition NAT services, referred to as Carrier Grade NAT (CGNAT), as telecommunications service providers need to further stretch the lit ted pool of Public IPv4 addresses.

CGNAT adds an additional translation layer to standard NAT that allows telecommunications service providers to preserve their designated public IPv4 addresses by processing subscriber traffic through the service provider's private IPv4 network. CGNAT allows multiple customer networks with their own internal network address space to route through a service provider's internal network address space and share the service provider's single public Internet IPv4 address for access to the Internet.

DETAILED DESCRIPTION OF EXAMPLE EMBODIMENTS

Figure 1:
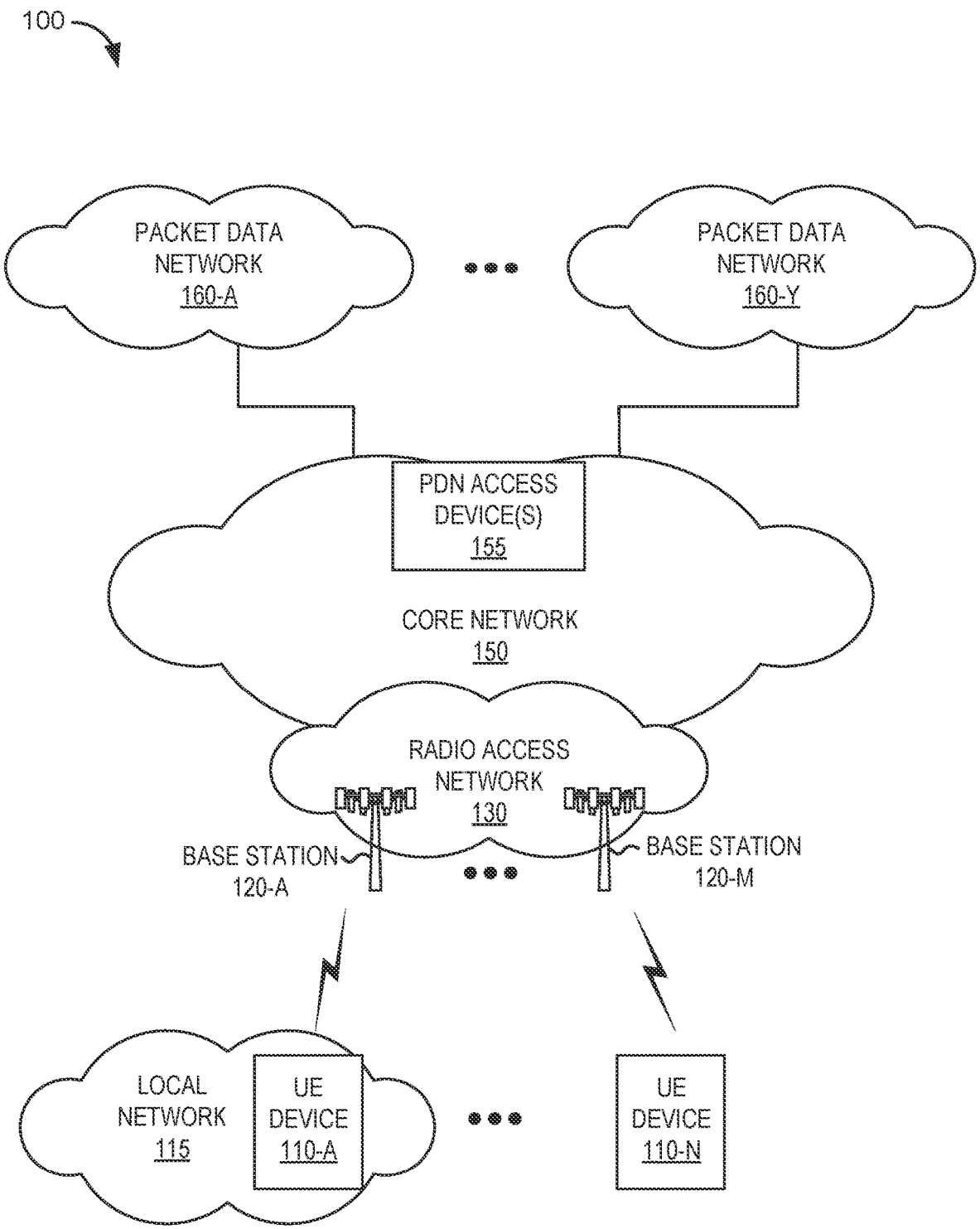
FIG. 1 illustrates an environment according to an implementation described herein.

The following detailed description refers to the accompanying drawings. The same reference numbers in different drawings identify the same or similar elements.

Much of the Internet is still dependent on IPv4, even though IPv6 has been available for a number of years. Since IPv4 public addresses are scarce, telecommunications carriers use carrier-grade NAT (CGNAT) solutions to enable many subscribers to share an IPv4 address. In the CGNAT solution, each subscriber is allocated a set of ports associated with a specific public IPv4 address for their flows. As the subscriber sets up a new application/flow, gateway devices in the carrier's core network will automatically assign a port for that flow, and the flow will retain that port until the flow is closed.

Transport Control Protocol (TCP) is the most common connection-oriented protocol used by applications, and it includes a well-defined process by which the two ends of the connection can indicate that they wish for the connection to be closed. A gateway in the core network normally monitors the TCP exchange to detect when the application wants to close the TCP connection. When the gateway detects that a TCP connection has been closed, it starts a specific timer called the 2MSL (e.g., twice the maximum segment lifetime) timer. While the 2MSL timer is running, the gateway keeps the NAT connection open, to enable any queued or re-transmitted messages to be delivered. When the 2MSL timer expires, the gateway will remove the NAT binding and free up the NAT port for use by another application.

The optimal value for the gateway 2MSL timer is not straightforward and involves some trade-offs. For any connection, the TCP client and server each have their own values of 2MSL timers, but the gateway is unable to know what those timer values are. Setting the 2MSL to a large value is advantageous to the client and server, since that simplifies their logic if any stray packets are delivered late, or if the application decides it needs to re-start the TCP connection after signaling that the connection can be closed. For example, the Windows™ operating system uses a 120 second 2MSL timer by default. The most conservative approach would be for a telecommunications carrier to also set a large value (e.g., 120 seconds or more) for the 2MSL timer at the gateway, since that would ensure that the application client and server never experience any issues from the premature loss of the NAT port binding. However, it is very disadvantageous to telecommunications carriers to use a large 2MSL timer value. Particularly, while the 2MSL timer is running, the corresponding NAT port is sitting idle and is not usable by any other application and is, thus, a wasted resource during this time interval. Since public IPv4 addresses are scarce and expensive, a telecommunications carrier would prefer a much more aggressive (e.g., smaller) 2MSL timer value. For example, gateways in the core network could be configured with a 2MSL timer of about 20 seconds, so that the available public IPv4 addresses and their associated ports are used more efficiently.

There are occasional situations when using an aggressive gateway 2MSL timer value (e.g., set to about 20 seconds or less) causes issues with applications. Specifically, a problem arises when the gateway frees up a port for reuse, and the same application then reuses that port before the server 2MSL timer has expired. In this instance, the server may receive an attempt to set up a new connection using a port that it thinks is already assigned to an existing TCP connection. In many cases, this causes the application to misbehave, potentially leading to a poor user experience (for example, the need to close and restart the application, need to power cycle the device, etc.). Currently, there is no good way for a telecommunications carrier to avoid this type of problem, since the gateway has no way to know in advance what the application 2MSL timer value is or whether the application will or will not work well with an aggressive gateway 2MSL timer. While increasing the gateway 2MSL timer to a large value for all port assignments could eliminate these occasional problems, the impact of limiting access to public IPv4 addresses would be unacceptable from a carrier perspective. Thus, without a new approach, customers will continue to encounter occasional situations where this timer value causes issues with certain applications.

Systems and methods described herein reduce the incidence of application issues related to the aggressive gateway 2MSL timer values described above. A variable 2MSL timer (also referred to herein as a "port reuse timer") is provided for the core network/gateway. As described further herein, the current single gateway 2MSL timer value is replaced by a dynamic 2MLS timer or two-stage 2MLS timer. According to an implementation, a network device in the core network detects closing of a session that uses a port designated for Network Address Translation (NAT), monitors an overall NAT port utilization level, and manages release timing for the port based on the overall port utilization level.

FIG. 1 is a diagram of an environment 100 in which the systems and/or methods described herein may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-M (referred to herein collectively as "base stations 120" and individually as "base station 120"), core network 150 that includes packet data network (PDN) access device(s) 155, and PDNs 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, or another type of portable computer; a desktop computer; a customer premises equipment (CPE) device, such as a set-top box or a digital media player, a WiFi access point, a smart television, etc.; a portable gaming system; a global positioning system (GPS) device; a home monitoring device; an IoT device and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. In some implementations, UE device 110 may communicate using machine-to-machine (M2M) communication, such as Machine Type Communication (MTC) for Internet of Things (IoT) applications.

In some instances, UE device 110 may be connected from a local network 115. Local network 115 may include a private network (e.g., a customer network, an in-house network, etc.) which may include a local area network (LAN), a wide area network (WAN), or a combination of networks. Local network 115 may provide network access to devices in core network 150 or serve as a stand-alone network. Different local networks 115 may have different network identifiers and may assign private IP address (e.g., that are not globally unique) to UE devices 110. Thus, Network Address Translation (NAT) and/or CGNAT may be required for core network 150 to provide public IP addresses that can be used when accessing PDNs 160.

Base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may include base stations 120 and be managed by a provider of wireless communication services. RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Core network 150 may be managed by the provider of cellular wireless communication services and may manage communication sessions of subscribers connecting to core network 150 via RAN 130. For example, core network 150 may establish an Internet Protocol (IP) connection between UE devices 110 and PDN 160. Core network 150 may include a 4G core network, a 5G core network, or a combined 4G/5G network.

The components of core network 150 may be implemented as dedicated hardware components, VNFs, and/or CNFs, implemented on top of a common shared physical infrastructure using Software Defined Networking (SDN). For example, an SDN controller may implement one or more of the components of core network 150 using an adapter implementing a VNF virtual machine, a CNF container, an event driven serverless architecture interface, and/or another type of SDN architecture. The common shared physical infrastructure may be implemented using one or more devices 200 described below with reference to FIG. 2 in a cloud computing center associated with core network 150.

PDN access devices 155 may function as a gateway to a PDN 160 and/or another network (not shown in FIG. 1) reachable through a PDN 160. In some instances, a particular PDN access device 155 may be associated with a particular Access Point Name (APN) and UE device 110 may connect to the particular APN by connecting to the particular PDN access device 155. If core network 150 corresponds to a 4G LTE network, PDN access device 155 may include a PDN Gateway (PGW) device. If core network 150 corresponds to a 5G network, PDN access device 155 may include a User Plane Function (UPF) node device. In some other implementations, functions of PDN access device 155 described herein may be implemented in a serving gateway (SGW), session management function (SMF), or another network element within core network 150.

PDN access device 155 may maintain an anchor point for UE device 110 mobility, perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, and/or perform other types of functions associated with a PDN access. Furthermore, in implementations described herein, PDN access device 155 may server as NAT device to perform port assignments for CGNAT.

PDNs 160-A to 160-Y may each include a packet data network. A particular PDN 160 may be associated with an APN and UE device 110 may request a connection to the particular packet data network 160 using the APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
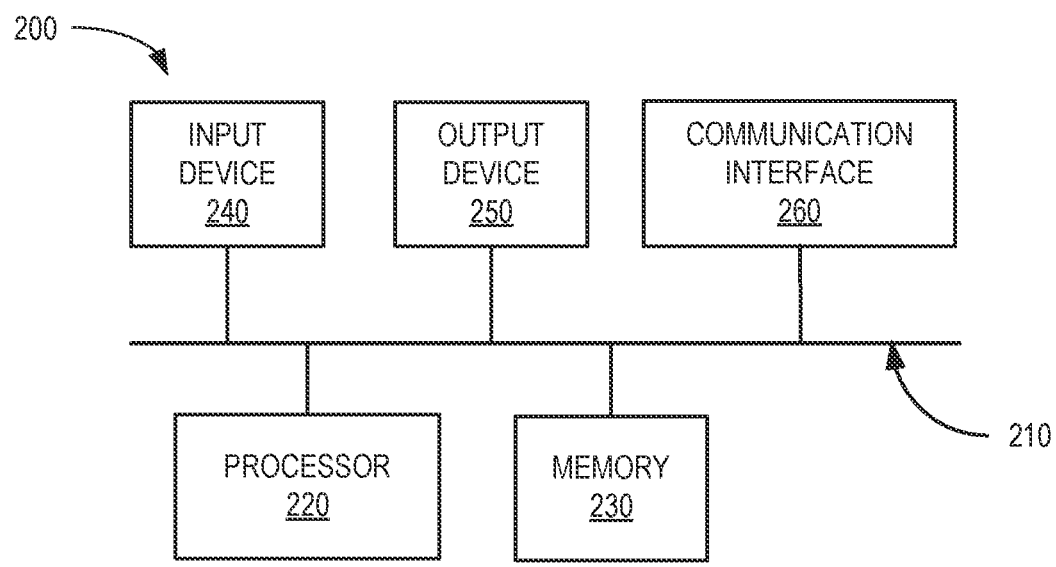
FIG. 2 illustrates example components of a device that may be included in the components of FIG. 1 according to an implementation described herein.

FIG. 2 is a diagram illustrating example components of a device 200 according to an implementation described herein. Each of the components of FIG. 1 may include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to exposure-function-based user equipment identity. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
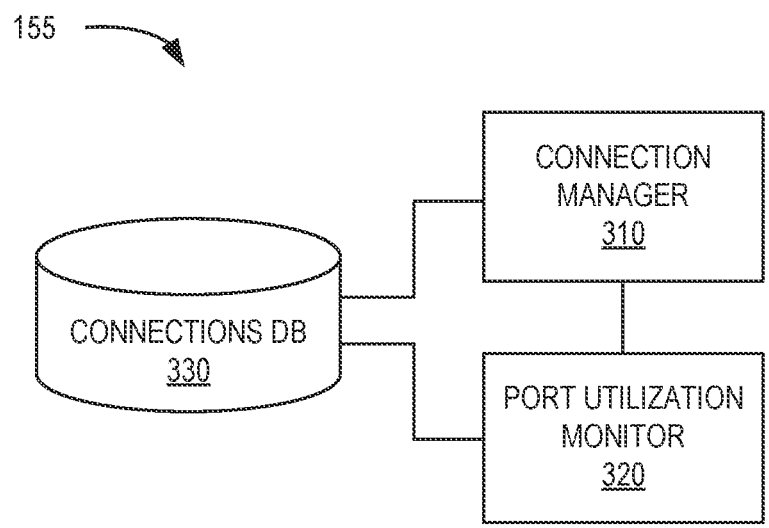
FIG. 3 is a block diagram illustrating examples of logical components of Packet Data Network (PDN) access device, according to an implementation described herein.

FIG. 3 is a block diagram illustrating examples of logical components of PDN access device 155. The components of PDN access device 155 may be implemented, for example, via processor 220 executing instructions from memory 230. Alternatively, some or all of the components of PDN access device 155 may be implemented via hard-wired circuitry. As shown in FIG. 3, PDN access device 155 may include a connection manager 310, port utilization monitor 320, and a connections DB 330.

Connection manager 310 may manage connections associated with UE devices 110. For example, connection manager 310 may allocate an IP address and/or port to UE device 110 when UE device 110 attaches to core network 150 and may establish a connection between base station 120 serving UE device 110 and a network, such as packet data network 160. According to implementations described herein, connection manager 310 may apply a variable port reuse timer to permit aggressive NAT port allocation based on overall NAT port utilization levels, while minimizing the incidence of application issues. In one implementation, connection manager 310 may dynamically assign a 2MSL timer value when a TCP session closes on a NAT port, based on the current overall NAT port utilization level. In another implementation, connection manager 310 may apply a two-stage 2MSL timer that permits accounting for overall NAT port utilization levels. In other implementations, connection manager 310 may use a different timer schema for managing NAT port allocations based on overall NAT port utilization levels.

In addition to the new port reuse timer configuration, the connection manager 310 may make a corresponding change to how port assignments are managed when a new application/flow starts for a subscriber. The current single 2MSL timer allows a port to be in one of two different states, "assigned" or "unassigned." In an assigned state, the port is already in use by an application and is not available to use for a new application. In an unassigned state, the port is not in use by any application and is available to be assigned to a new application.

When dynamically assigning 2MSL timer values, connection manager 310 may continue to designate ports to an assigned state or unassigned state. When a TCP session, for example, using a port is closed by the participating client (e.g., UE device 110) and server (e.g., a network device in PDN network 160), connection manager 310 may identify a port utilization level from port utilization monitor 310. Based on the utilization level, connection manager 310 may select a dynamic 2MSL timer value (e.g., ranging between a minimum and maximum value), apply the selected 2MSL timer value to the closed port whole maintaining an assigned state, and designate the closed port with an unassigned state when the selected 2MSL timer value expires.

When using a two-stage timer, a single 2MSL timer is replaced by two different timers referred to herein as a "2MSL-binding timer" and a "2MSL-aging timer." Also, connection manager 310 may add a third port state, referred to herein as an "aging" state. A port in the aging state is available to be assigned to a new application, but connection manager 310 will try not to use a port in the aging state if other unassigned ports are available for use. That is, ports in an unassigned state may be prioritized for assignment over ports in an aging state. Different approaches may be used for implementing the prioritization of unassigned ports over aging ports.

The 2MSL-binding timer (also referred to as a "binding timer") controls the amount of time connection manager 310 keeps the NAT connection active for packet delivery, similar to the current 2MSL timer. Before the 2MSL-binding timer expires, the corresponding port remains in an assigned state. However, in contrast with existing practice, when the 2MSL-binding timer expires, connection manager 310 does not immediately free the port up for reuse. Instead, it places the port into an "aging" state. The 2MSL-aging timer (also referred to as an "aging timer") controls the amount of time the connection manager 310 keeps the port in an aging state, after transitioning from an assigned state.

According to one approach, a port in the aging state may only be used when no unassigned ports are available. However, if a telecommunications carrier over-subscribes NAT ports and/or assigns the NAT ports to subscribers in blocks (e.g., blocks of 16, 32, or 48 ports at a time), this approach might negatively impact NAT utilization on PDN access device 155.

According to another approach, a decision on whether to use a port in the aging state may be based on the current NAT port utilization at PDN access device 155. Thus, when NAT ports are plentiful (e.g., when fewer users are online or less activity is occurring), connection manager 310 can bypass the aging ports and simply use unassigned ports for new applications/flows. However, when the PDN access device 155 is busy, connection manager 310 can re-use a port in the aging state. For example, a telecommunications carrier may configure a port utilization threshold (e.g., 70%, 80%, etc., of local port utilization at PDN access device 155) at which NAT ports in the aging state may be assigned. If NAT port utilization is below the utilization threshold, then connection manager 310 will only use unassigned ports and let aging ports continue to age. But if NAT port utilization is higher than the utilization threshold, then connection manager 310 will freely reuse ports in the aging state to make NAT ports available for new subscribers. For example, connection manager 310 may use unassigned ports first, and then assign ports from the aging state in order of decreasing age. That is, connection manager 310 may use the ports that have been aging a longer time sooner than ports that have been aging a shorter time. In other implementation, ports assigned from the aging state may be selected, for example, in any order to permit assignment of contiguous blocks.

Port utilization monitor 320 may monitor NAT port utilization for PDN access device 155 and/or core network 150. Port utilization monitor 320 may, for example, monitor data from connections DB 330 to identify port states and current port utilization levels. Port utilization monitor 320 may provide port utilization levels to connections manager 310 to support NAT port allocation based on overall NAT port utilization levels.

Connections DB 330 may store information relating to UE device connections managed by connection manager 310. For example, connections DB 330 may store, for a particular UE device 110, information identifying UE device 110 (e.g., MSISDN, IMSI, etc.), an allocated IP address and/or port for UE device 110, a RAT type associated with UE device 110, a network ID and/or APN with which UE device 110 is enabled to communicate, and/or other types of information associated with UE device 110.

Although FIG. 3 shows examples of some logical components of PDN access device 155, in other implementations PDN access device 155 may include more, fewer, or different logical components that illustrated in FIG. 3. For example, PDN access device 155 may include additional logical components for performing functions as a PGW, UPF, SMF, etc.

Figure 4A:
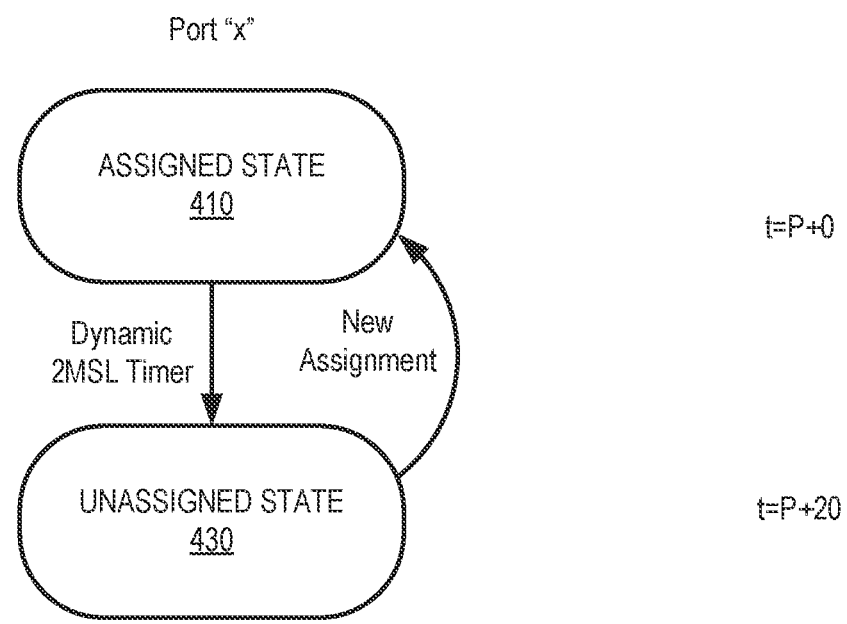
FIGS. 4A and 4B are state diagrams illustrating examples of port states using a dynamic port reuse timer, according to an implementation.
Figure 4B:
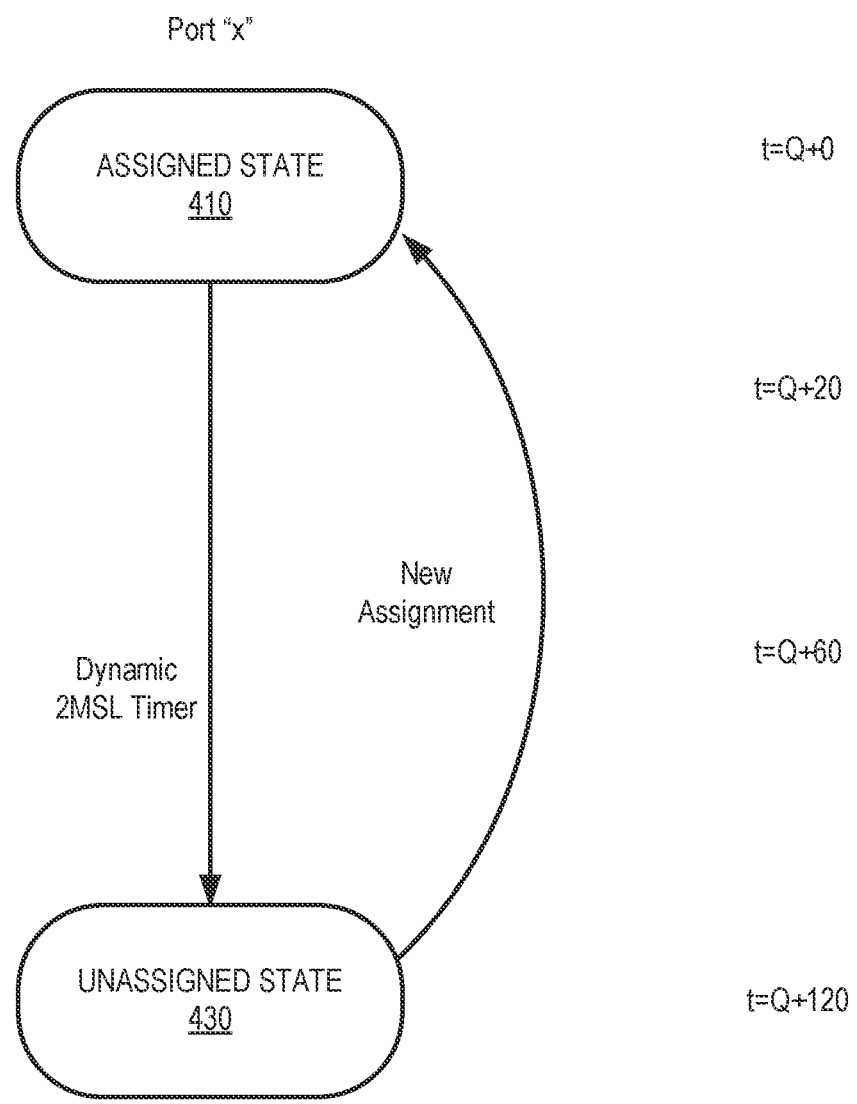

FIGS. 4A and 4B are state diagrams 400 illustrating examples of port states using a dynamic port reuse timer, according to an implementation described herein. PDN access device 155 may control port states and assignments based on processes illustrated in FIGS. 4A and 4B. Assume that a PDN access device 155 employs a variable 2MSL timer, which can be set dynamically between an aggressive port reuse level, such as about 20 seconds (referred to as "2MSL-min") and a conservative port reuse level, such as 120 seconds (referred to as "2MSL-max"), depending on the port utilization level at a given point in time. Assume for both FIGS. 4A and 4B that a port "x" starts in an assigned state 410, assigned to an application and actively being used for NAT.

Referring to FIG. 4A, at a first time P (indicated as "t=P+0" in FIG. 4A), a client (e.g., UE device 110) and server (e.g., a network device in PDN 160) agree to close a TCP connection that used port "x." Upon detecting that the TCP connection has been closed (e.g., detecting an sequence of TCP FIN, ACK, FIN messages indicating endpoints are ready to close a connection), PDN access device 155 may dynamically determine a 2MSL timer value to use based on the current NAT port utilization (e.g., at time P). For FIG. 4A, assume IPV4 port utilization levels are high in core network 130. Thus, PDN access device 155 may assign a dynamic 2MSL timer value at or near its minimum value (2MSL-min). When the dynamic 2MSL timer expires at the minimum time, e.g., t=P+2MSL-min (e.g., about 20 seconds), PDN access device 155 may designate port "x" to unassigned state 430. Port "x" is now freely available to be assigned to a new application/flow.

Referring to FIG. 4B, at another time Q, a client (e.g., UE device 110) and server (e.g., in PDN 160) agree to close a TCP connection that used port "x." Upon detecting that the TCP connection has been closed, PDN access device 155 may dynamically determine a 2MSL timer value to use based on the current NAT port utilization (e.g., at time Q). For FIG. 4B, assume IPV4 port utilization levels are low. Thus, PDN access device 155 may assign a dynamic 2MSL timer value at or near its maximum value (2MSL-max). When the dynamic 2MSL timer expires at the maximum time, e.g., t=Q+2MSL-max seconds (e.g., about 120 seconds), PDN access device 155 may designate port "x" to unassigned state 430. Port "x" is now freely available to be assigned to a new application/flow.

While FIGS. 4A and 4B illustrate two scenarios for using a dynamic port reuse timer, in other implementations, the dynamic state timer may be set to any value between the min and max (e.g., between 2MSL-min and 2MSL-max). For example, PDN access device 155 may apply different port utilization thresholds that correspond to intervening dynamic 2MSL timer values (e.g., timer values between 2MSL-max and 2MSL-min). Alternatively, PDN access device 155 may apply continuously variable 2MSL timer values between 2MSL-max and 2MSL-min based on a current port utilization threshold.

Figure 5:
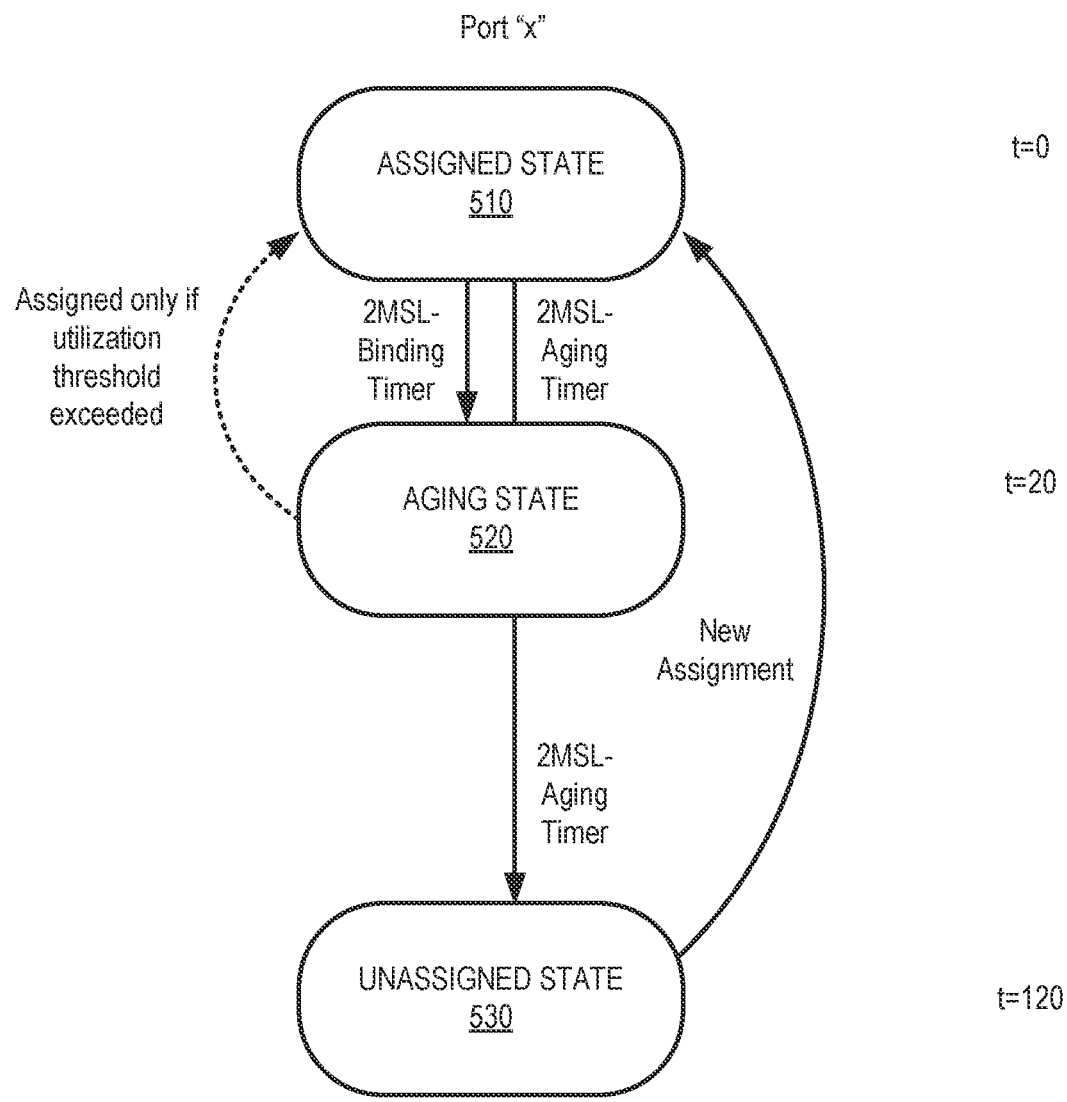
FIG. 5 is a state diagram illustrating an example of port states using a two-stage port reuse timer, according to an implementation described herein.

FIG. 5 is a state diagram 500 illustrating an example of port states using a two-stage port reuse timer, according to an implementation described herein. The two-stage port reuse timer may be considered a particular implementation of a variable port reuse timer. PDN access device 155 may control the port state and assignments based on processes illustrated in FIG. 5. Assume that a 2MSL-binding timer is set to 20 seconds, and a 2MSL-aging timer is set to 120 seconds. A port "x" is in an assigned state 510, assigned to a new application and actively being used for NAT.

At a time t=0, the client (e.g., UE device 110) and server (e.g., in PDN 160) agree to close a TCP connection that used port "x." Upon detecting that the TCP connection has been closed, PDN access device 155 may start the 2MSL-binding timer and the 2MSL-aging timer.

For the period from t=0 to the time t=20 seconds, PDN access device 155 maintains the NAT port binding so that any remaining or retransmitted packets between the client and server will be delivered. During this time, port "x" will remain in the assigned state 510 and cannot be used for another application.

At t=2MSL-min (e.g., 20 seconds), the 2MSL-binding timer expires. In response, PDN access device 155 removes the NAT binding so the application can no longer transmit packets between client and server using port "x." Also, at the expiration of the 2MSL-binding timer, the PDN access device 155 places port "x" in aging state 520. In the aging state 520, port "x" is available to be assigned to a new application/flow, but PDN access device 155 will refrain from doing so as long as a sufficient number of local ports (e.g., below the utilization threshold) in the unassigned state are available.

At time t=2MSL-max (e.g., 120 seconds), the 2MSL-aging timer expires and PDN access device 155 moves port "x" to unassigned state 530. Port "x" is now freely available to be assigned to a new application/flow. Use of the 2MSL-binding timer and the 2MSL-aging timer delays the reassignment of a port for a longer period whenever port utilization rates indicate the longer period is feasible. This will greatly reduce the likelihood that the port will be reused for an application that still believes the port is active on another TCP connection. However, when PDN access device 155 becomes busy, the NAT ports can still be reused aggressively so that the telecommunications carrier will not need to allocate more of the scarce public IPv4 addresses.

Figure 6:
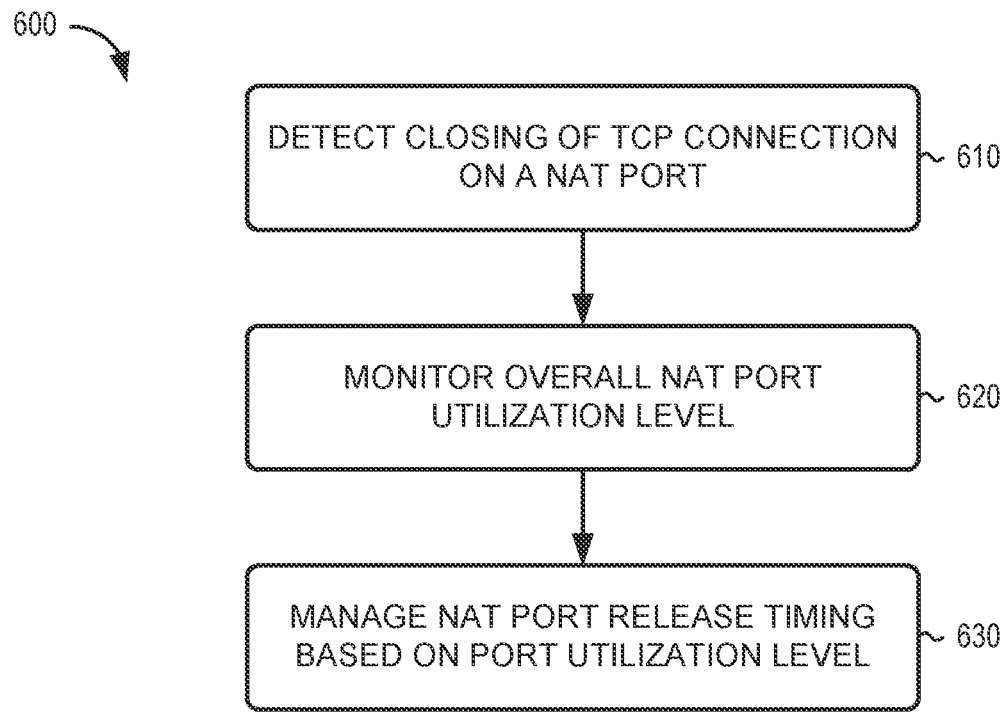
FIGS. 6-8 are a flow diagram illustrating exemplary processes for employing variable NAT port reuse timers, according to implementations described herein.

FIG. 6 is a flow diagram illustrating an exemplary process 600 for employing variable NAT port reuse timers. In one implementation, process 600 may be performed PDN access device 155. In another implementation, process 600 may be implemented by one or more other devices in core network 120.

Referring to FIG. 6, process 600 may include detecting a closing of a TCP connection on a NAT port (block 610) and monitoring overall NAT port utilization levels (block 620). For example, PDN access device 155 may detect that the TCP connection between a UE device 110 and a device in PDN 160 has been closed. PDN access device 155 may identify a current NAT port utilization level for NAT ports within a network (e.g., core network 150), such as whether the number of assigned NAT ports is above or below a designated utilization threshold (e.g., 70% assigned, 80% assigned, etc.).

Process 600 may further include designating NAT port release timing based on the port utilization level (block 630). For example, PDN access device 155 may apply variable port reuse timers to permit aggressive NAT port reuse when the overall NAT port utilization levels exceed a threshold or to permit conservative NAT port reuse when the overall NAT port utilization levels do not exceed the threshold. PDN access device 155 may implement a dynamic port reuse timer or a two-stage port reuse timer to permit different wait times for releasing the NAT port with the closed TCP connection. If a dynamic port reuse timer is used, PDN access device 155 may select a dynamic 2MSL timer value based on the current NAT port utilization level, as described further in connection with FIG. 8. If a two-stage port reuse timer is used, PDN access device 155 may apply a 2MSL-binding timer and a 2MSL-aging timer, as described further in connection with FIG. 8.

Figure 7:
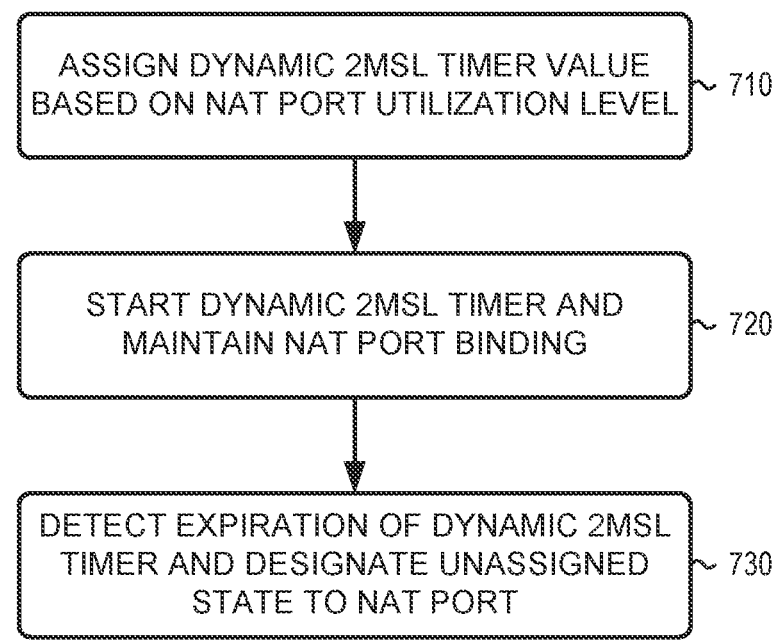

According to an implementation, process block 630 may include process blocks described in FIG. 7. As shown in FIG. 7, process 630 may include assigning a dynamic 2MSL timer value based on the overall NAT port utilization level (block 710), starting the dynamic 2MSL timer while maintaining the NAT port binding (block 720), and detecting expiration of the dynamic 2MSL timer and designating an assigned state to the NAT port (block 730). For example, PDN access device 155 may select a dynamic 2MSL timer value (e.g., 2MSL-min, 2MSL-max, or an intermediate value), apply the selected 2MSL timer value to the closed port whole maintaining an assigned state, and designate the closed port as "unassigned" when the selected 2MSL timer value expires.

Figure 8:
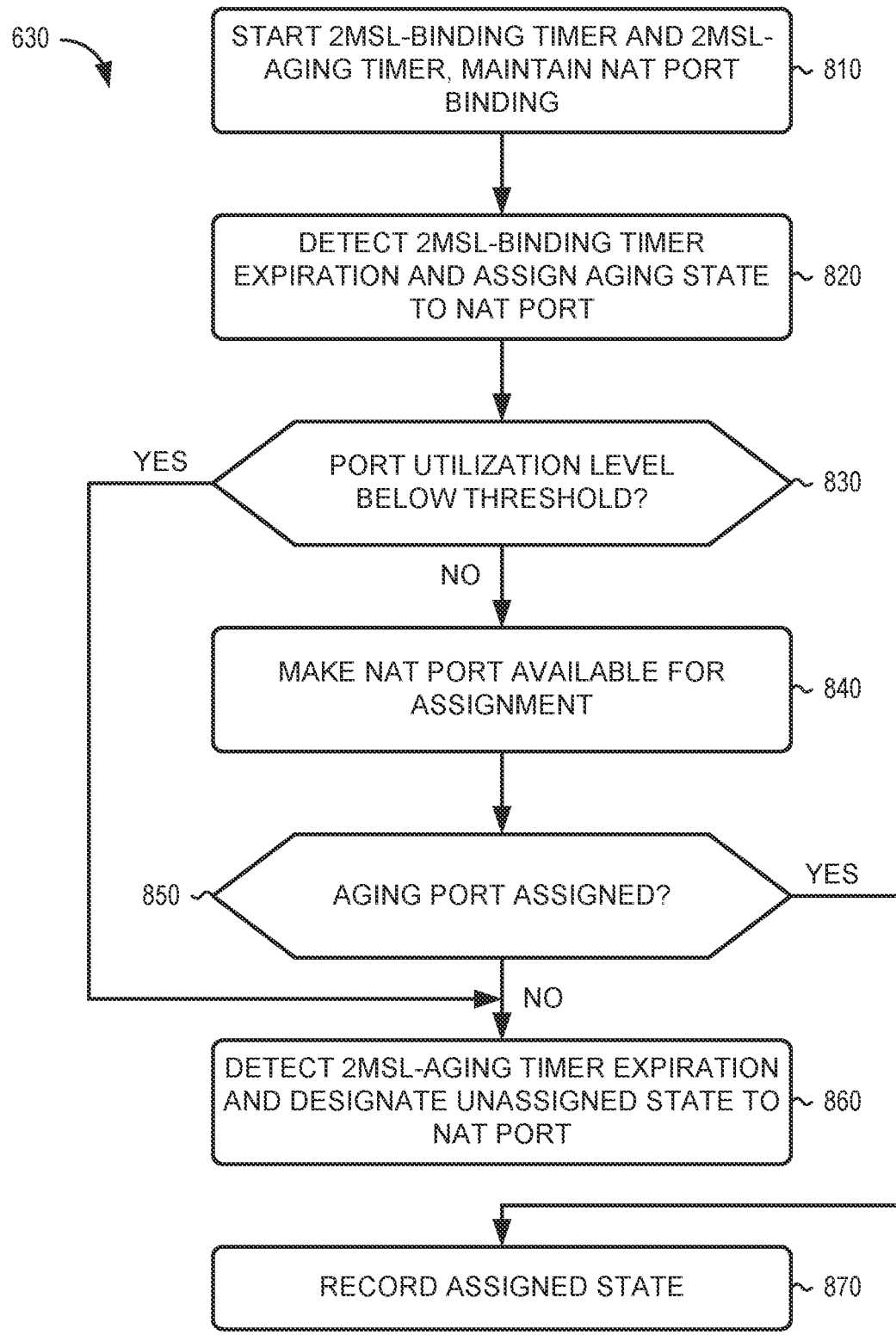

According to another implementation, process 630 may include process blocks described in FIG. 8. As shown in FIG. 8, process 630 may include starting a 2MSL-binding timer and a 2MSL-aging timer while maintaining the NAT port binding (block 810), detecting expiration of the 2MSL-binding timer and assigning an aging state to the NAT port (block 820), and determining if the port utilization level is below an overall utilization threshold (block 830). For example, PDN access device 155 may start the 2MSL-binding timer and the 2MSL-aging timer and maintain the NAT port binding so that any remaining or retransmitted packets between the client and server will be delivered. During this time, the closed port remains in an assigned state and cannot be used for another application. After the 2MSL-binding timer expires, PDN access device 155 may designate the port with an "aging" state and remove the NAT binding so packets can no longer be transmit over the port. In the aging state, the port is available to be assigned to a new application/flow if the overall NAT port utilization level exceeds a threshold.

When the port utilization level is not below the threshold (block 830—No), process 630 may further include making the closed NAT port available for assignment (block 840) and determining if the aging port is selected for assignment (block 850). For example, if overall utilization levels for NAT ports exceeds a threshold level, PDN access device 155 may assign the aging NAT port to meet a new request, if necessary.

If the aging port is selected for assignment (block 850—Yes), process 630 may include recording the assigned state (block 870). For example, PDN access device 155 may switch the port from an aging state to an assigned state. When the port utilization level stays below the threshold (block 830—Yes) or if no assignment of the closed port is made while in the aging state (block 850—No), process 630 may further include detecting expiration of the 2MSL-aging timer and designating an unassigned state to the NAT port (block 860). For example, as long the overall NAT port utilization threshold remains below a set threshold (e.g., 70% assigned, 80% assigned, etc.), PDN access device 155 may wait for expiration of the 2MSL-aging timer before designating the aging port as unassigned.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6-8, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method comprising:
detecting, by a network device in a core network, closing of a session that uses a port designated for Network Address Translation (NAT);
monitoring, by the network device, an overall NAT port utilization level; and managing, by the network device, release timing for the port based on one or more thresholds for the overall NAT port utilization level, wherein the managing comprises:
  starting, in response to the detecting, a binding timer and an aging timer,
  maintaining the port in an assigned state until the binding timer expires, and
  designating the port with an aging state after the binding timer expires and before the aging timer expires.

2. The method of claim 1, wherein the aging state permits assignment by the network device when the overall NAT port utilization level exceeds a threshold.

3. The method of claim 1, wherein ports in an unassigned state are prioritized for assignment over ports in the aging state.

4. The method of claim 1, wherein managing the release timing for the port further comprises:
  assigning the port in the aging state for a new session when the overall NAT port utilization level is above a threshold level; or
  designating the port with an unassigned state after the aging timer expires.

5. The method of claim 1, wherein the network device includes:
  a Packet Data Network Gateway (PGW), or
  a User Plane Function (UPF).

6. The method of claim 1, wherein managing the release timing for the port further comprises:
  assigning ports from the aging state in order of decreasing age.

7. The method of claim 1, wherein managing the release timing for the port further comprises:
  assigning ports from the aging state to prioritize assignment of contiguous blocks.

8. The method of claim 1, wherein the network device includes:
  a Packet Data Network Gateway (PGW), or
  a User Plane Function (UPF).

9. A network device comprising:
  a processor configured to:
  detect, in a core network, closing of a session that uses a port designated for Network Address Translation (NAT);
  monitor an overall NAT port utilization level; and
  manage release timing for the port based on one or more thresholds for the overall NAT port utilization level, wherein the managing comprises:
    starting, in response to the detecting, a binding timer and an aging timer,
    maintaining the port in an assigned state until the binding timer expires, and
    designating the port with an aging state after the binding timer expires and before the aging timer expires.

10. The network device of claim 9, wherein ports in an unassigned state are prioritized for assignment over ports in the aging state.

11. The network device of claim 9, wherein the aging state permits assignment by the network device when the overall NAT port utilization level exceeds a threshold.

12. The network device of claim 9, wherein, when managing the release timing for the port, the processor is further configured to:
  assign the port in the aging state for a new session when the overall NAT port utilization level is above a threshold level; or
  designate the port with an unassigned state after the aging timer expires.

13. The network device of claim 9, wherein the network device includes:
  a Packet Data Network Gateway (PGW), or
  a User Plane Function (UPF).

14. The network device of claim 9, wherein, when managing the release timing for the port, the processor is further configured to:
  assign ports from the aging state in order of decreasing age.

15. The network device of claim 9, wherein, when managing the release timing for the port, the processor is further configured to:
  assign ports from the aging state to prioritize assignment of contiguous blocks.

16. A non-transitory, computer-readable storage medium storing instructions executable by a processor of a network device, which when executed cause the network device to:
  detect, in a core network, closing of a session that uses a port designated for Network Address Translation (NAT);
  monitor an overall NAT port utilization level; and
  manage release timing for the port based on one or more thresholds for the overall NAT port utilization level, wherein the instructions to manage the release timing further cause the network device to:
    start, in response to the detecting, a binding timer and an aging timer;
    maintain the port in an assigned state until the binding timer expires; and
    designate the port with an aging state after the binding timer expires and before the aging timer expires.

17. The non-transitory, computer-readable storage medium of claim 12, wherein the instructions to manage the release timing for the port further cause the network device to:
  prioritize for assignment ports in an unassigned state over ports in the aging state.

18. The non-transitory, computer-readable storage medium of claim 12, wherein the instructions to manage the release timing for the port further cause the network device to:
  assign ports from the aging state to prioritize assignment of contiguous blocks.

19. The non-transitory, computer-readable storage medium of claim 16, wherein the aging state permits assignment by the network device when the overall NAT port utilization level exceeds a threshold.

20. A method comprising:
  detecting, by a network device in a core network, closing of a session that uses a port designated for Network Address Translation (NAT);
  monitoring, by the network device, an overall NAT port utilization level; and
  managing, by the network device, release timing for the port based on one or more thresholds for the overall NAT port utilization level, wherein managing the release timing further comprises:
    applying variable port reuse timers to permit aggressive NAT port reuse when the overall NAT port utilization levels exceed a threshold, and applying the variable port reuse timers to permit conservative NAT port reuse when the overall NAT port utilization levels do not exceed the threshold.

\* \* \* \* \*